US008301318B2

(12) United States Patent
Lacaze et al.

(10) Patent No.: US 8,301,318 B2
(45) Date of Patent: Oct. 30, 2012

(54) ROBOTIC VEHICLE REMOTE CONTROL SYSTEM HAVING A VIRTUAL OPERATOR ENVIRONMENT

(75) Inventors: Alberto D. Lacaze, Germantown, MD (US); Karl N. Murphy, Rockville, MD (US); Kyle R. Smith, Gaithersburg, MD (US); Raymond P. Wilhelm, III, Gaithersburg, MD (US)

(73) Assignee: Robotic Research LLC, Gaithersburg, MD (US)

( * ) Notice: Subject to any disclaimer, the term of this patent is extended or adjusted under 35 U.S.C. 154(b) by 461 days.

(21) Appl. No.: 12/398,610

(22) Filed: Mar. 5, 2009

(65) Prior Publication Data

US 2009/0276105 A1 Nov. 5, 2009

Related U.S. Application Data

(60) Provisional application No. 61/064,433, filed on Mar. 5, 2008.

(51) Int. Cl.
*G05D 1/00* (2006.01)
(52) U.S. Cl. ............................................. 701/2; 701/1
(58) Field of Classification Search .................. 701/1–2, 701/23
See application file for complete search history.

(56) References Cited

U.S. PATENT DOCUMENTS

| | | | | |
|---|---|---|---|---|
| 6,108,031 | A * | 8/2000 | King et al. ..................... | 348/118 |
| 7,286,913 | B2 * | 10/2007 | Bodin et al. ..................... | 701/11 |
| 2004/0158355 | A1 * | 8/2004 | Holmqvist et al. ........... | 700/245 |
| 2004/0167669 | A1 * | 8/2004 | Karlsson et al. .............. | 700/259 |
| 2007/0038422 | A1 * | 2/2007 | Wang et al. ....................... | 703/8 |
| 2007/0061071 | A1 * | 3/2007 | Torii .............................. | 701/209 |
| 2007/0124000 | A1 * | 5/2007 | Moughler et al. ................ | 700/9 |
| 2008/0027591 | A1 * | 1/2008 | Lenser et al. ..................... | 701/2 |
| 2009/0018712 | A1 * | 1/2009 | Duncan et al. .................... | 701/2 |

OTHER PUBLICATIONS

Ebken, J., et al., "Applying Unmanned Ground Vehicle Technologies to Unmanned Surface Vehicles", SPAWAR Systems Center, San Diego, CA, 2005 12 pages.
Albus, J., et al., "The NIST Real-time Control System (RCS) An Applications Survey", Journal of Experimental and Theoretical Artificial Intelligence, vol. 9, 1995, 9 pages.
Nesnas, I., et al., "CLARAty: An Architecture for Reusable Robotic Software", SPIE Aerosense Conference, 2003, 12 pages.
Volpe, R., et al., "The CLARAty Architecture for Robotic Autonomy", IEEE Aerospace Conference, 2001, 12 pages.
Sukkarieh, S., et al., "A High Integrity IMU/GPS Navigation Loop for Autonomous Land Vehicle Applications", IEEE Transactions on Robotics and Automation, vol. 15, No. 3, Jun. 1999, pp. 572-578.
Raymond, D. Waves in One Dimension [online], Apr. 7, 2006 [retrieved on Jan. 3, 2012]. Retrieved from the Internet <URL: http://kestrel.nmt.edu/~raymond/classes/ph13xbook/node7.html>.

* cited by examiner

*Primary Examiner* — Hussein A. Elchanti
(74) *Attorney, Agent, or Firm* — Pillsbury Winthrop Shaw Pittman LLP

(57) ABSTRACT

A control system for a remotely operated vehicle is disclosed. The control system includes a sensor tracking system configured to sense the remotely operated vehicle. The control system is coupled to the sensor tracking system and is configured to remotely control the remotely operated vehicle. The control system includes a synthetic view generator configured to construct a virtual model of the remotely operated vehicle and its surrounding environment based upon an input from the sensor tracking system. The control system also includes a graphical user interface configured to display a synthetic view of the virtual model. In addition, the control system includes a synthetic viewer control configured to manipulate an orientation of the synthetic view.

25 Claims, 14 Drawing Sheets

ROBOTIC VEHICLE REMOTE CONTROL SYSTEM HAVING A VIRTUAL OPERATOR ENVIRONMENT

CROSS REFERENCE TO RELATED APPLICATIONS

The present application claims priority to provisional application 61/064,433, filed on Mar. 5, 2008, and which is hereby incorporated by reference in its entirety.

FIELD OF THE INVENTION

The present invention relates to the field of control systems for remotely operated robotic vehicles such as land-vehicles, water-borne vehicles, aircraft, and spacecraft, and more particularly to a control system for remotely operated robotic vehicles that includes a virtual operator environment.

BACKGROUND OF THE INVENTION

The use of remotely operated robotic vehicles is highly desirable for a variety of civilian and military applications. Remotely operated robotic devices can greatly improve the completion of mission tasks by assisting or replacing the human participant. A remotely operated robotic device can be successfully used in dangerous situations, placing its human operator out of harm's way in the safety of a remote control room. In addition, a remotely operated robotic vehicle can also greatly enhance the effectiveness of its operators in the performance of mission tasks through its endurance, flexibility, and expendability. The pursuit of advanced control systems that enhance the utility of remotely controlled robotic devices is therefore highly desirable to improve their performance.

SUMMARY OF THE INVENTION

The present invention relates to a control system for a remotely operated vehicle. The control system includes a sensor tracking system configured to sense a remotely operated vehicle. The remotely operated vehicle may be manned or unmanned. The control system is coupled to the sensor tracking system and is configured to remotely control the remotely operated vehicle. The control system includes a synthetic view generator configured to construct a virtual model of the remotely operated vehicle and its surrounding environment based upon an input from the sensor tracking system. The control system also includes a graphical user interface configured to display a synthetic view of the virtual model. In addition, the control system includes a synthetic viewer control configured to manipulate an orientation of the synthetic view. Further, the control system includes an operator control unit configured to control the remotely operated vehicle.

The control system may further include a prediction module configured to predict a future state of the remotely operated vehicle based upon information from the sensor tracking system. Also, the control system may generate the synthetic view using a stored CAD drawing of the remotely operated vehicle. The control system may also include an operator aid module configured to generate a recommended course of action based upon information from the sensor tracking system. The operator aid module may be configured to generate warnings regarding a potential course of action based upon information from the sensor tracking system. The sensor tracking system may include LADAR, a camera, a GPS unit, or an inertial guidance system. The virtual model may be constructed from a surface mesh generated from information provided by the sensor tracking system.

The present invention also relates to a virtual control environment for remotely operating a robotic vehicle. The virtual control environment includes a sensor array that detects the robotic vehicle and its surrounding environment. The virtual control environment also includes a module configured to generate a computer model of the robotic vehicle and its surrounding environment based upon information collected by the sensor array. The virtual control environment further includes a synthetic view generator module configured to create virtual views of the robotic vehicle and its surrounding environment based upon the computer model. In addition, the virtual control environment includes a graphical user interface configured to display a virtual view created by the synthetic view generator module. Also, the virtual control environment includes an operator control unit configured to control the robotic vehicle based upon the virtual view.

The virtual control environment may further include a prediction module configured to predict a future state of the remotely operated vehicle based upon information from the sensor array. In addition the virtual view may be generated using a stored CAD drawing of the remotely operated vehicle. Further, the virtual control environment may include an operator aid module configured to generate a recommended course of action based upon information from the sensor array. Also, the virtual control environment of claim 11 may include an operator aid module configured to generate warnings regarding a potential course of action based upon information from the sensor array. The sensor array may include a LADAR, a camera, a GPS unit, or an inertial guidance system. The computer model may constructed from a surface mesh generated from information provided by the sensor array.

The present invention also relates to a method of controlling a remotely operated vehicle with a virtual images of the remotely operated vehicle. The method includes remotely sensing the remotely operated vehicle and its surrounding environment with a sensor array. The method also includes generating a virtual model of the remotely operated vehicle and its surrounding environment based upon information gathered by the sensor array. The method further includes generating a virtual view of the remotely operated vehicle and its surrounding environment. In addition, the method includes displaying the virtual view on a graphical user interface and controlling the operation of the remotely operated vehicle based upon viewing the virtual view.

The method may further include predicting a future state of the remotely operated vehicle based upon information from the sensor array. The method may also include displaying a live image of the remotely operated vehicle on the graphical user interface. In addition, the method may also include generating a recommended course of action based upon information from the sensor array. Further, the method may include generating warnings regarding a potential course of action based upon information from the sensor array.

Other objects, features and aspects of the invention will become apparent from the following detailed description, the accompanying drawings, and the appended claims.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

DETAILED DESCRIPTION

While the invention has been shown and described with reference to a particular embodiment thereof, it will be understood to those skilled in the art, that various changes in form and details may be made therein without departing from the spirit and scope of the invention.

Figure 1:
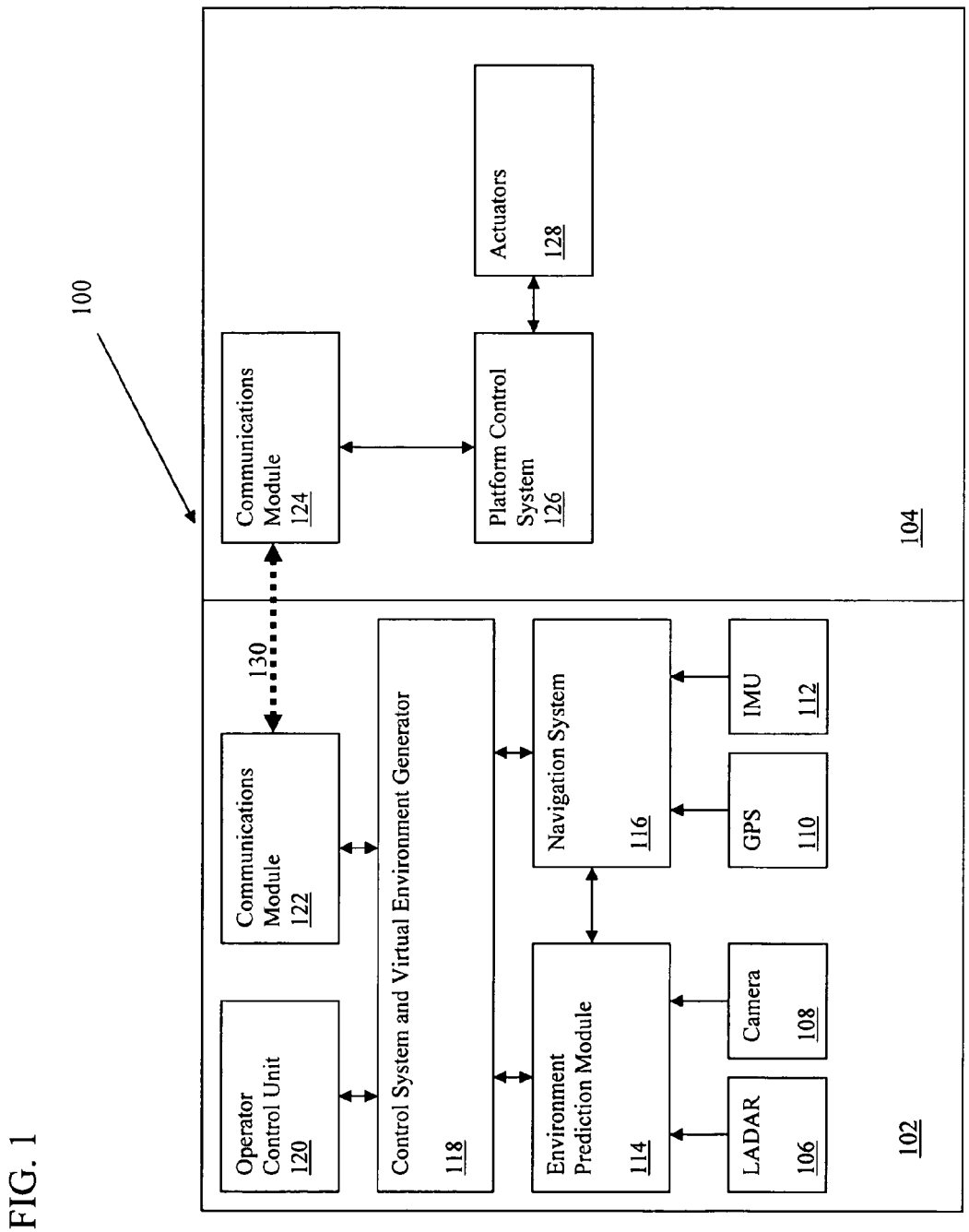
FIG. 1 illustrates a block diagram of a control system for remotely operating a robotic vehicle from a mother ship according to a preferred embodiment of the invention.

FIG. 1 illustrates a block diagram of a control system 100 for remotely operating a robotic vehicle 104 from a mother ship 102 according to a preferred embodiment of the invention. Robotic vehicle 104 may be an unmanned vehicle, or a manned vehicle. If robotic vehicle has human occupants, those occupants may have the option of exercising direct command and control of the operation of robotic vehicle 104. Control system 100 is provided to allow a remote operator to have the ability to remotely command and control the operation of robotic vehicle 104. Control system 100 allows an operator who is stationed on mother ship 102 to remotely control robotic vehicle 104. For example, robotic vehicle 104 may be an remote controlled aircraft such as a plane, helicopter, or airship. Robotic vehicle 104 may also be a remote controlled land vehicle, a remotely controlled surface watercraft, or a remotely controlled submarine. It is also contemplated the robotic vehicle 104 may be a remotely controlled space craft. Mother ship 102 may be any kind of craft or vehicle that can support an operator for remotely controlling robotic vehicle 104. For example, in naval applications, mother ship 102 may be a naval vessel such as a littoral combat ship and robotic vehicle 104 may be a smaller remotely operated watercraft, such as a boat or submarine, that is launchable and recoverable from mother ship 102. Alternatively, in aeronautical applications, mother ship 102 may be a command and control aircraft such as an AWACS aircraft and robotic vehicle 104 may be a robotic drone aircraft. System 100 is configured to provide real-time robotic vehicle 104 tracking, path recommendations/warnings, and enhanced views not possible with conventional sensors. System 100 results in reduced manpower requirements, increased safety, and lead the way to increased autonomy of robotic vehicle 104.

Mother ship 102 has a sensor tracking array that includes LADAR (LAser Detecting And Ranging) 106, optical camera 108, GPS (Global Positioning System) 110, and IMU (Inertial Measurement Unit) 112. LADAR 106 is an imaging system that provides near-photographic quality images of potential targets by measuring the elapsed time from a laser transmission to the reflected return of the pulse. RADAR may also be used in combination with LADAR 106. LADAR 106 provides 3-Dimensional range measurements that are represented as point clouds, shown in FIG. 10. The strength of the return of the LADAR signal in combination with the range provides a measurement of the reflectivity of the surface. Utilizing this property in, for example, naval applications, allows for the hull of the incoming vessel to be discerned from the surrounding water. Current LADAR sensors have multi-return pulse timing logic capable of 50 psec timing accuracy and a 2.5 nsec minimum event separation. Optical camera 108 is a conventional imaging system that takes video of robotic vehicle 104 and its surrounding environment. GPS unit 110 provides the position of mother ship 102. IMU 112 is the main component of an inertial guidance systems that is used in air-, space-, and watercraft. IMU 112 works by sensing motion including the type, rate, and direction of that motion using a combination of accelerometers and gyroscopes. The data collected from these sensors allows a computer to track the position of mother ship 102 using a method known as "dead reckoning."

LADAR 106 and camera 108 sense the position, orientation and overall state of robotic vehicle 104 and its surrounding environment. The information gathered by LADAR 106 and camera 108 are provided to environment prediction module 114. GPS unit 110 and IMU 112 provide information on the position and movement of mother ship 102. The information from GPS unit 110 and IMU 112 are fed into the navigation system 116 of mother ship 102. Navigation system 116 is the control system that regulates the movement of mother ship 102.

Navigation system 116 is configured to bi-directionally communicate with environment prediction module 114. Environment prediction module 114 is a system that processes the information regarding the state and environment of robotic vehicle 104 as wells as that of mother ship 102 in order to provide accurate 3-Dimensional modeling on the current and future behavior of the joint mothership 102 and robotic vehicle system 104 in the surrounding environment. For example, in naval applications, the use of LADAR 106 and camera 108 allows for the detection and modeling of ocean waves and currents surrounding the mother ship 102 and robotic vehicle 104 by environment prediction module 114. In addition, environment prediction module 114 is able to ascertain the current position and relative orientation and movement of mother ship 102 and robotic vehicle 104 utilizing information from LADAR 106, camera 108 and navigation system 116. Together, environment prediction module 114 allows for the modeling of the current and predicted future behavior of the overall mother ship 102, robotic vehicle 104, and surrounding environmental system.

Having the capability to model and predict the future behavior of this system greatly enhances the utility of control system 100. For example, the probability of success for recovering a robotic naval vehicle 104 on board mother ship 102 will increase as detection and modeling of the effects of ocean waves and the wake of mother ship 102 becomes more accurate. The efficient and accurate modeling of ocean waves and wave/hull interaction greatly enhances the probability of successfully recovering robotic naval vehicle 104. Alternatively, in an aeronautical application where a remotely controlled drone aircraft 104 is being refueled by a tanker aircraft 102, RADAR may be used to monitor air-turbulence surrounding the tanker aircraft 102 and drone 104. Successfully modeling and predicting the current and future behavior of the tanker aircraft 102 and drone 104 system would greatly increase the likelihood of successfully docking and refueling the drone 104.

State of the art systems typically employ costly finite element analysis to analyze these systems. Although the most accurate, these systems are typically not feasible to be run in real-time. Additionally, the complex system parameters used are typically not observable in real-world tests conducted outside of the laboratory. Thus, for real-time analysis much simpler models are typically employed to predict the dominant first and second order effects. For naval application high fidelity wave models are integrated with ship wake generation techniques into environment prediction module 114. For modeling the wave effects, the use of wave particles developed by Cem Yuksel, et al. is one exemplary method. Wave particles are used for modeling the propagation and interaction of surface waves with floating objects. Wave particles provide a computationally efficient way to model the generation of surface waves caused by wave/hull interaction. This will provide a model for how the incoming robotic vehicle 104 will interact with the mother ship's 104 wake. Rather than computing the complex dynamics contracting and expanding wave fronts, multiple propagating wave particles are used to approximate a wave front. Simplified point particles are propagated through 2-Dimensional space over time with exponentially decaying amplitude. The superposition of all wave particles provides the height at every location of the water's surface. New wave particles are created utilizing the concept of volume conservation. As a floating object (in this case, the mother ship 102 or robotic vehicle 104 hull) moves, the displaced water generates wave particles. Realistic simulations involving the interaction of multiple vessels in real-time has been demonstrated on off-the-shelf desktop computers.

Precise relative positioning and coordination of the vessel dynamics between the mother ship 102 and robotic vehicle 104 are desirable during the launch and recovery of robotic vehicle 103 and to ensure the safety of both vessels. The modeling performed by environment prediction module 114 accounts for the nonlinear coupling motions of heave, pitch and roll. An extreme phenomenon that may occur in this system is parametric resonance, whereby the energy in heave and pitch motions may be transferred to roll motion mode. This leads to excessive resonant rolling and stability problems. Excessive rolling motion increases the difficulty of precise control, and in the worst case, this could cause the vehicle to capsize. Because of the lateral symmetry of ship hull forms, linear theories are unable to account for the coupling between heave, pitch and roll. It is quite often that roll motion is treated as a single Degree Of Freedom (DOF) dynamic problem, whereas heave and pitch are solved in a coupled two DOF system. One exemplary approach to tackle the nonlinear coupling between the three is to employ simplified hydrodynamic memory effect models to simulate this problem. Most approaches using this method are heavily simplified where coupling effects are removed.

The environment and prediction module 114 generates a model of the mother ship 102 and robotic vehicle 104 system and its interaction with the water that is capable of accurately determining the state of that system in real time. Modeling wave motion allows for planning robotic vehicle 104 maneuvers into the future. The use of environment and prediction module 114 allows for robotic vehicle 104 simulation to evaluate command sequences for control of the robotic vehicle 104. The environment and prediction module determines both the overall cost of the possible control sequences so that the operator can receive both recommendations and warnings.

Environment prediction module 114 can predict future behavior of the mother ship 102 and robotic vehicle 104 system by, for example, computing a series of throttle and steering commands that best achieve mission success given all mission constraints. This is done by using a 2-Dimensional time planner. The environmental prediction module 114 will send possible actions, such as steering and throttle to the vessel model and will then evaluate the predicted outcome. The resulting paths will be evaluated on several criteria such as relative location to the mother ship 102, pitch, roll, and potential for capsizing, pitch polling, and wave wash over. Using the wave models, environment prediction module 114 will then compute the effect of the hull/wave interaction to determine the resulting motion of the robotic vehicle 104 given a particular throttle/steering command.

The 3-Dimesional model of the mother ship 102, robotic vehicle 104, and surrounding environmental system is provided to control system and virtual environment generator 118. Control system 118 is coupled to operator control unit 120 and communications module 122. Operator control unit 120 is the system that interfaces with an operator to control robotic vehicle 104 with information provided by environment prediction module 114. Communications module 112 communicates the control instructions generated by control system 118 from operator input in operator control unit 120 to communications module 124 on robotic vehicle 104 over communications link 130.

The control instructions received by communications module 124 are fed to platform control system 126, which is coupled to actuators 128. Actuators 128 implement the control instructions provided by operator control 120, thereby controlling robotic vehicle 104.

Current robotic vehicles often have a camera mounted on them that provide an operator with a view from the robotic vehicle as if they were sitting in the control seat of the robotic vehicle. The use of cameras to provide this sort of view from the vehicle has numerous deficiencies. First of all, in real life applications, various environmental conditions inhibit the use of a camera to provide a visual view, such as ocean spray, crashing waves, rain, fog, night, dust storms, etc. Further, providing a live view from a camera feed limits the operator to seeing what the camera sees only. Control system 118 is configured to take the 3-Dimensional model generated by environment prediction module and create synthetic views of the mother ship 102, robotic vehicle 104, and surrounding environmental system for use by an operator in operator control unit 120. By use of this 3-Dimensional model, control system 118 can generate any synthetic, or virtual view of the mother ship 102, robotic vehicle 104, and surrounding environmental system desired by the operator. For example, control system 118 could generate a view of robotic vehicle 104 as if a virtual camera were located behind the robotic vehicle, to the side of the robotic vehicle 104, at an angle to the robotic vehicle 104, or on top of the robotic vehicle 104. By having the ability to generate synthetic or virtual views of the mother ship 102, robotic vehicle 104, and surrounding environmental system using 3-Dimensional computer modeling, control system 118 is able to enhance the ability of an operator to control robotic vehicle 104. For example, when attempting to dock or launch a robotic naval vessel 104 from a mother ship 102, the most advantageous view for effectively controlling the operation of robotic naval vessel 104 may be from a virtual top down view, instead of a view of a camera mounted directly on robotic vehicle 104.

The creation of synthetic views using control system 118 to control robotic vehicle 104 also has numerous other advantages. Conventional robotic vehicles utilize a live camera feed from the vehicle that is transmitted to the operator. This solution provides the operator with a natural, first-person view for controlling the vehicle. However, the low frame-rate, high-latency, and limited field-of-view (restrictions imposed by communications limitations) of the camera severely impairs the operator's ability to control the vehicle. In contrast, by remotely sensing the state of robotic vehicle 104 with LADAR 106 and camera 108, control system 100 does not require the transmission of any information from robotic vehicle 104. While robotic vehicle 104 does not need to transmit any information for the generation of the 3-Dimensional model by environment prediction module 114, robotic vehicle may include a GPS unit an inertial navigation system and transmit that information to mother ship 102 for including in the 3-Dimensional model. The elimination of the requirement for this high-bandwidth transmission hardens system 100 to environmental conditions and potential interference by enemy combatants. Additionally, in the maritime environment, the sensors may be severely affected by environmental conditions, such as sea spray or high sea states.

An alternative to first-person teleoperation is to utilize direct views from the host ship. Directly viewing the vehicle allows the operator to better understand the scene, but often it is impractical due to safety concerns and equipment location. Raw mother ship 102 based sensor feeds provide high-bandwidth data, but provide non-intuitive, reverse-perspective views that make precision control difficult. However, by utilizing computer generated synthetic views derived from a 3-Dimesional model of the mother ship 102 and robotic vehicle 104 system, the operator can select from any desired view that allows for the best control of robotic vehicle 104. Further, by utilizing computer generated synthetic views, unwanted environmental conditions that would inhibit the view of the operator are not present, thereby enhancing the operator's control of the robotic vehicle 104.

Control system 118 utilizes high bandwidth mother ship 102-based sensor feeds that are transformed and fused into a common picture to provide the operator with the ideal vantage points needed for precision control of robotic vehicle 104. The relative position and orientation of the robotic vehicle 104 is tracked over time to enhance operator's situational awareness, improve visualizations, and to feed information to path evaluation and planning modules. The mother ship 102 wake and surrounding waves are actively measured in order to predict the forces that will be present on the robotic vehicle 104 in order to alert the operator of possible dangers and recommend successful control inputs.

Figure 3:
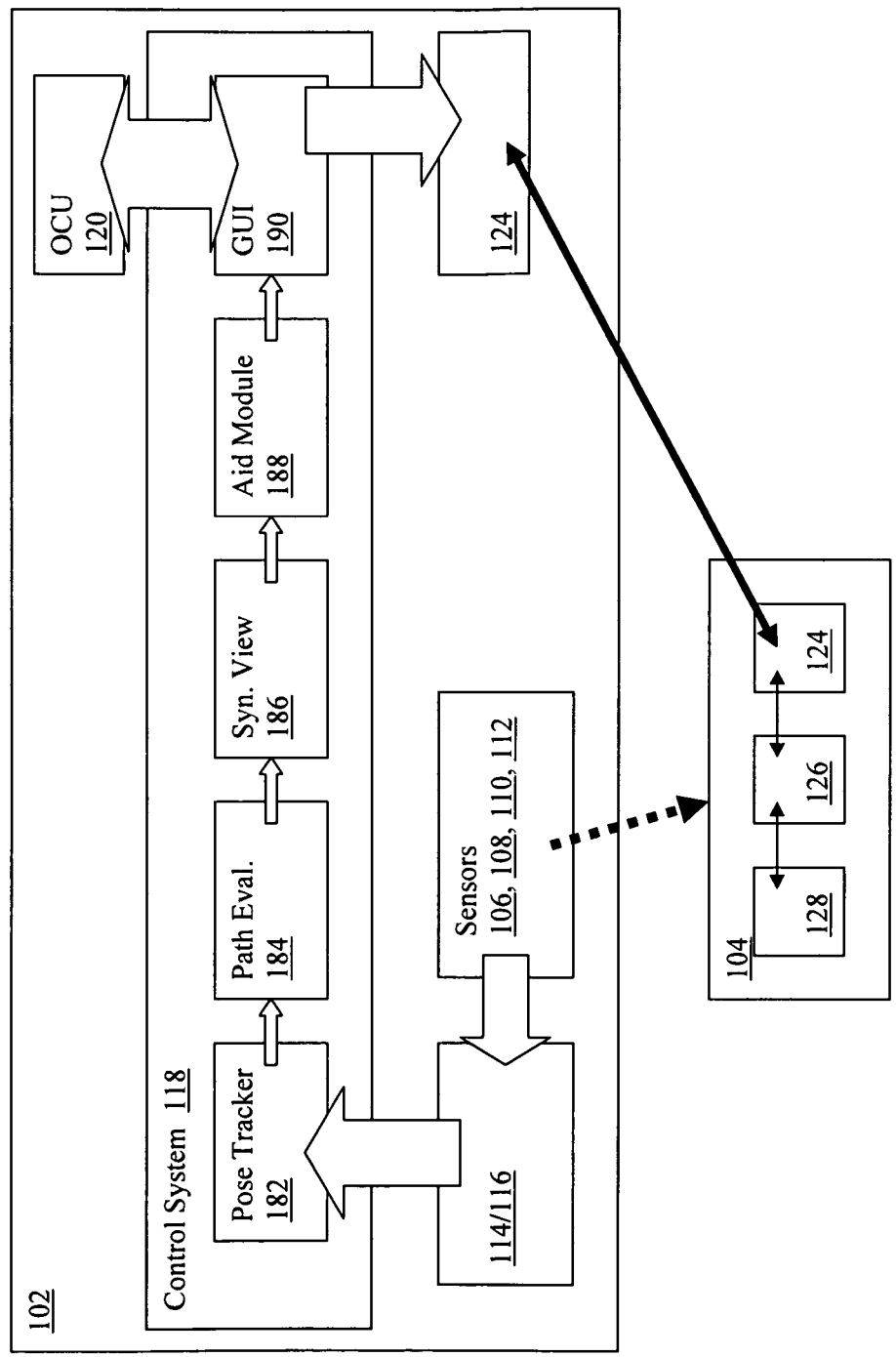
FIG. 3 illustrates a block diagram depicting operational modules within a control system according to a preferred embodiment of the invention.

Control system 118 also includes operator aid module 188, shown in FIG. 3, that provides key information and recommendations to the operator through a common Graphical User Interface (GUI) to facilitate natural understanding and quick decisions by the operator. The operator is able to blend their high-level intelligence with the raw and processed information provided by the control system 118.

The sensors utilized by system 100 have different strengths and weaknesses. In order to reduce the overall error of estimates by module 114, the Extended Kalman Filter (EKF) is used to filter measurements from the sensors 106, 108, 110 and 112 over time. The Kalman Filter is an efficient, recursive filter that utilizes a system and measurement model to optimally estimate linear systems. Measurements from different sensors of varying accuracy over time are used to form estimates of system states, making the EKF a very powerful framework for fusing multiple sensor streams into a single estimate of state. The non-linear EKF is required in this case because the filter will model and estimate orientation of the robotic vehicle 104. At each timestep, a prediction and correction step is performed in order to recursively calculate both the state estimates (robotic vehicle 104 position and orientation) and error bounds. The EKF uses the Jacobian of the non-linear system dynamics equations (instead of the linear coefficients used in the basic KF). By calculating the Jacobian at every timestep, the EKF is able to efficiently estimate the states of a non-linear system.

Through the fusion of these multiple sensor 106, 108, 110 and 112 streams, a single robust solution generated by module 114 and control system 118 can be utilized by the operator. Since each sensor 106, 108, 110 and 112 is affected differently by environmental conditions the overall system errors can be greatly reduced when compared to any single sensor solution. For example, during night or in the presence of fog, FLIR (Forward Looking InfraRed) cameras 108 are the primary imagery used by the operator. Radar sensors will help track the movement of the robotic vehicle 104 while the LADAR can provide the more accurate range and angle. System 100 is generally configured to operate in a system wherein robotic vehicle 104 is within sensor range of mother ship 102.

Figure 2:
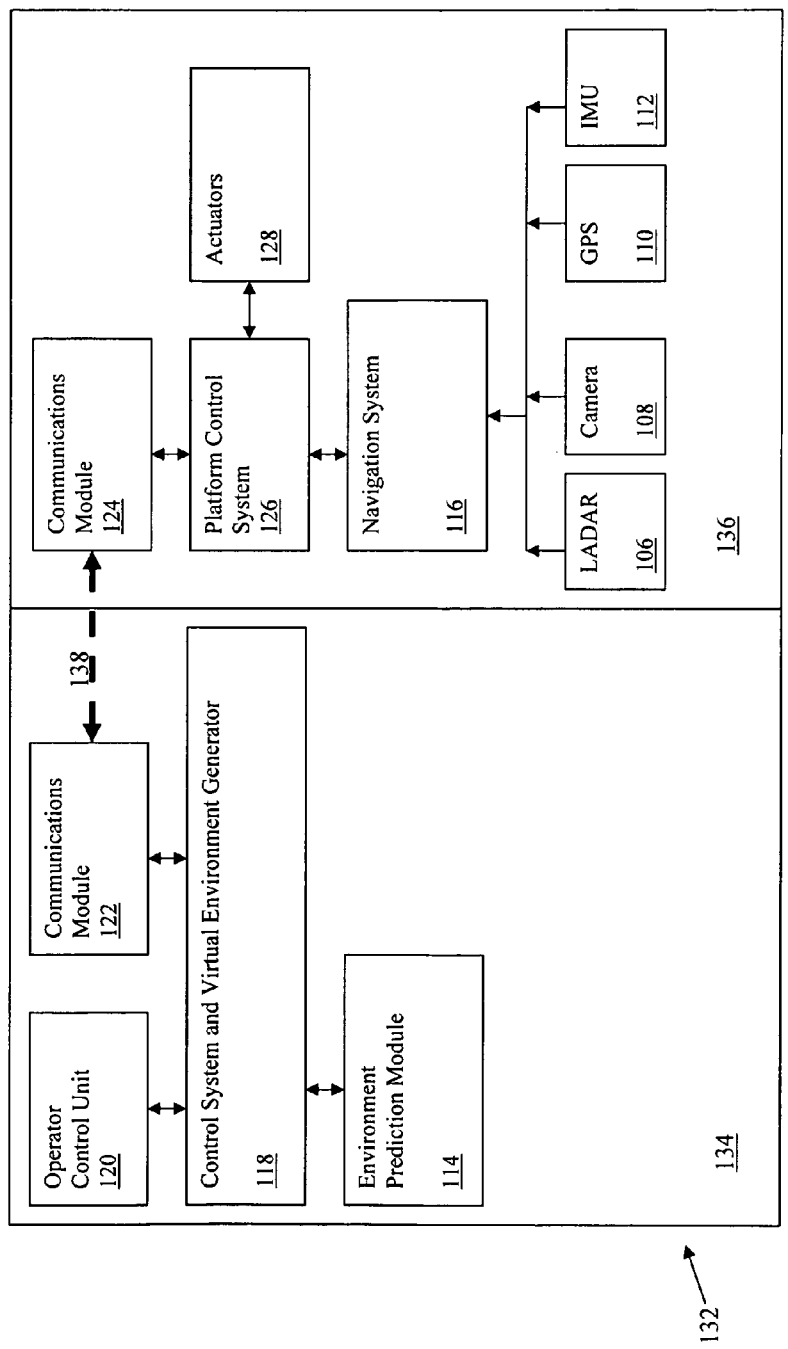
FIG. 2 illustrates a block diagram of a control system having a virtual operator environment for remotely operating a robotic vehicle according to an alternate embodiment of the invention.

FIG. 2 illustrates a block diagram of a control system 132 for remotely operating a robotic vehicle 136 according to an alternate embodiment of the invention. In this embodiment, robotic vehicle 136 is provided with the following sensors: LADAR 106, camera 108, GPS 110, and IMU 112. These sensors are coupled to a navigation system 116 on robotic vehicle 136. Robotic vehicle transmits the information from LADAR 106, camera 108, GPS 110, and IMU 112 back to a remote location 134 across a high-bandwidth communications link 138. Remote location 134 may be a moving vehicle, aircraft, seacraft, or stationary structure. System 132 is configured for a system where robotic vehicle 136 is not within sensor range of remote location 134. In system 132, environment prediction module 114 generates a 3-Dimensional model of robotic vehicle 136 and its surrounding environment from information gathered by LADAR 106, camera 108, GPS 110, and IMU 112 located on robotic vehicle 136. Control system 118 then creates synthetic computer generated views for operator control unit 120 to enable an operator to effectively control robotic vehicle 136. In addition, control system 118 provides operator aids, as described more fully in FIG. 3, that support the operation and control of robotic vehicle 136.

FIG. 3 illustrates a block diagram depicting operational modules 182, 184, 186 and 188 within control system 118 according to a preferred embodiment of the invention. While shown within mother ship 102, it is contemplated that control system 118 may also be located in remote location 134. Sensors 106, 108, 110 and 112 gather information about mother ship 102 and robotic vehicle 104. The information from sensors 106, 108, 110 and 112 is fed into environmental prediction module 114 and navigation system 112 and is utilized to generate a 3-Dimensional model. The information on the generated 3-Dimensional model is fed into control system 118. Pose tracker 118 continually estimate the current position, orientation, and speed of mother ship 102 and robotic vehicle 104. The track information is then used by the Path Evaluation/Generation module 184 to predict paths, evaluate risks, and recommend/warn the operator about the possible approach trajectories. For example, when approaching the rear of naval vessel 102, certain areas behind the naval vessel 102 will have severe turbulence due to the vessel wake and propeller chop. In the case of a large tanker aircraft 102, an approaching drone aircraft 104 may be exposed to severe air-turbulence due to the jet wash from aircraft 102. The path evaluation module 184 can predict an optimum approach vector for the robotic vehicle 104 as it approaches the mother ship 102.

Figure 13:
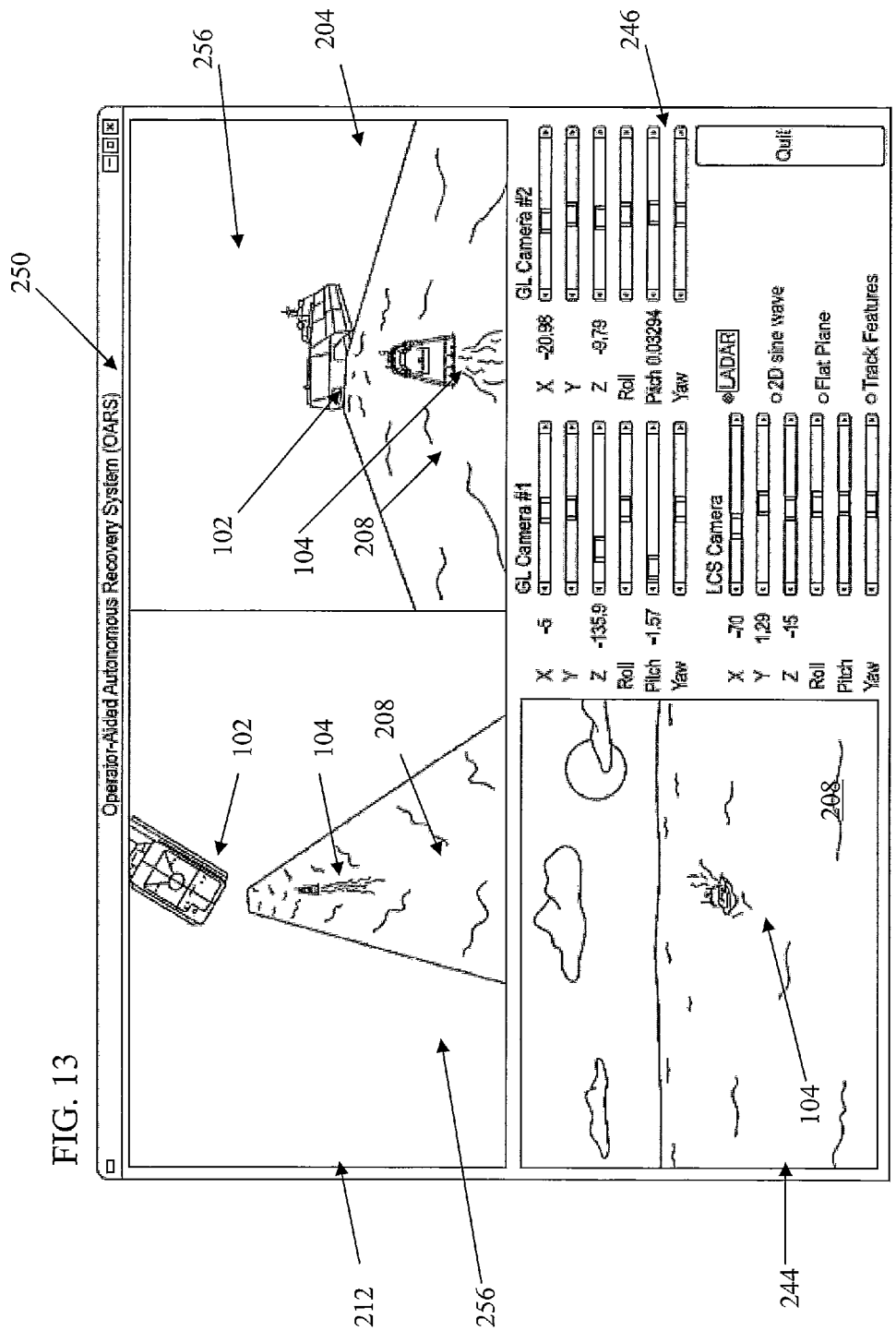
FIG. 13 illustrates a screen shot of a graphical user interface, which is displaying two synthetically generated views and a real camera view, that includes controls for positioning the virtual cameras and real camera according to a preferred embodiment of the invention.

Synthetic view module 186 creates desired synthetic or virtual views of the mother ship 102, robotic vehicle 104, and surrounding environmental system for display on GUI 190 for the operator. FIG. 13 illustrates a screen shot of synthetic view module 186 that enables a user to select desired virtual views for display on GUI 190.

The operator aid visualization module 188 displays both the raw and processed information to the user in a concise manner on GUI 190. Operators may choose from several different viewpoints as needed, including the warping of live video feeds to provide synthetic camera angles and recommended courses of action. The operator then utilizes this new information to determine the next throttle/steering command for robotic vehicle 104. In addition, the operator control unit 120 may also be given control of mother ship 102 through control system 118 and navigation system 116 while the operator attempts to launch or recover robotic vehicle 104.

To aid the operator, control system 118 provides accurate tracking of the relative orientation of the incoming robotic vehicle 104 with respect to the mother ship 102. In order to ensure operability with the many unique robotic vehicles 102, it is desirable that no sensor 106, 108, 110 or 112 equipment be installed on the robotic vehicle 104. It is desirable that all sensors reside on the mother ship 102 in order to minimize bandwidth and modifications that would need to be done to the deployed robotic vehicle 104.

Control system 118 provides advanced operator-aid visualizations through module 188 in order to improve the operator's situational awareness during the launch and recovery process. Control system 118 a human in-the-loop system that utilizes advanced sensing, filtering, and prediction to provide the operator with useful information during the launch and recovery process. The synthetic views generated by module 186 allow operator to change the virtual camera's position and orientation on-the-fly. In addition to these synthetic views, control system 118 is configured to display a variety of other graphical overlays and operator aids on GUI 190 to support the operator. These other overlays and aids can include a relative heave and pitch indicator. This indicator is useful when catching the tow line of robotic vehicle 104 and when it is being maneuvered aboard mother ship 102. In addition, the relative heave translation is useful for mission safety to prevent the robotic vehicle's 104 bow from colliding with the recovery ramp in high sea states. These graphical overlays and aids may also include highlighting the recovery line and catch mechanism on mother ship 102. It may also include highlighting the area where the recovery line is located so that the operator can make the correct approach to mother ship 102. Enhanced visualizations will allow the operator to precisely track and intercept the catch mechanism. Other graphical overlaps and aides may include relative speed with warnings. Control system 118 may present a simplified graphic that shows the filtered closing speed to the operator. These graphical aids may also include recommended vehicle location. Control system 118 may overlay the recommend robotic vehicle 104 location in the synthetic views generated by module 186. This feature will provide a target point that the operator can steer towards. A further aid may include mother ship 102 roll/pitch synchronization. During high sea states, the mother ship 102 will be pitching and rolling while the operator is looking at GUI 109. In some cases, this feature could aid the operator to synchronize the swaying of any synthetic camera feeds with the motion of the mother ship 102. This feature could prevent nausea which is sometimes induced by the conflict of senses when a visual display does not match the swaying felt by the operator.

Control system 118 and operator control unit 120 may be configured to display all graphics in 3-Dimensions to the operator. Using this technology has several benefits. With 3-D graphics, operators may be able to more naturally understand the scene resulting in quicker decisions. At long range, many operators use relative size of objects to judge distance. For example, if one sees an airplane from 500 meters away, humans cannot determine distance without preexisting knowledge of the airplane's size or the size of an object near the airplane. Many people use this approach to determine relative size of objects on 2-D representations of 3-D environments. On a computer monitor, one way to judge distance is to have a predefined notion of the size of the object being observed. Thus, the object's size within the GUI 190 tells the operator the distance to said object. However, with 3-D information, distances are much easier to determine because a predefined notion of the size of the object is not required.

Figure 4:
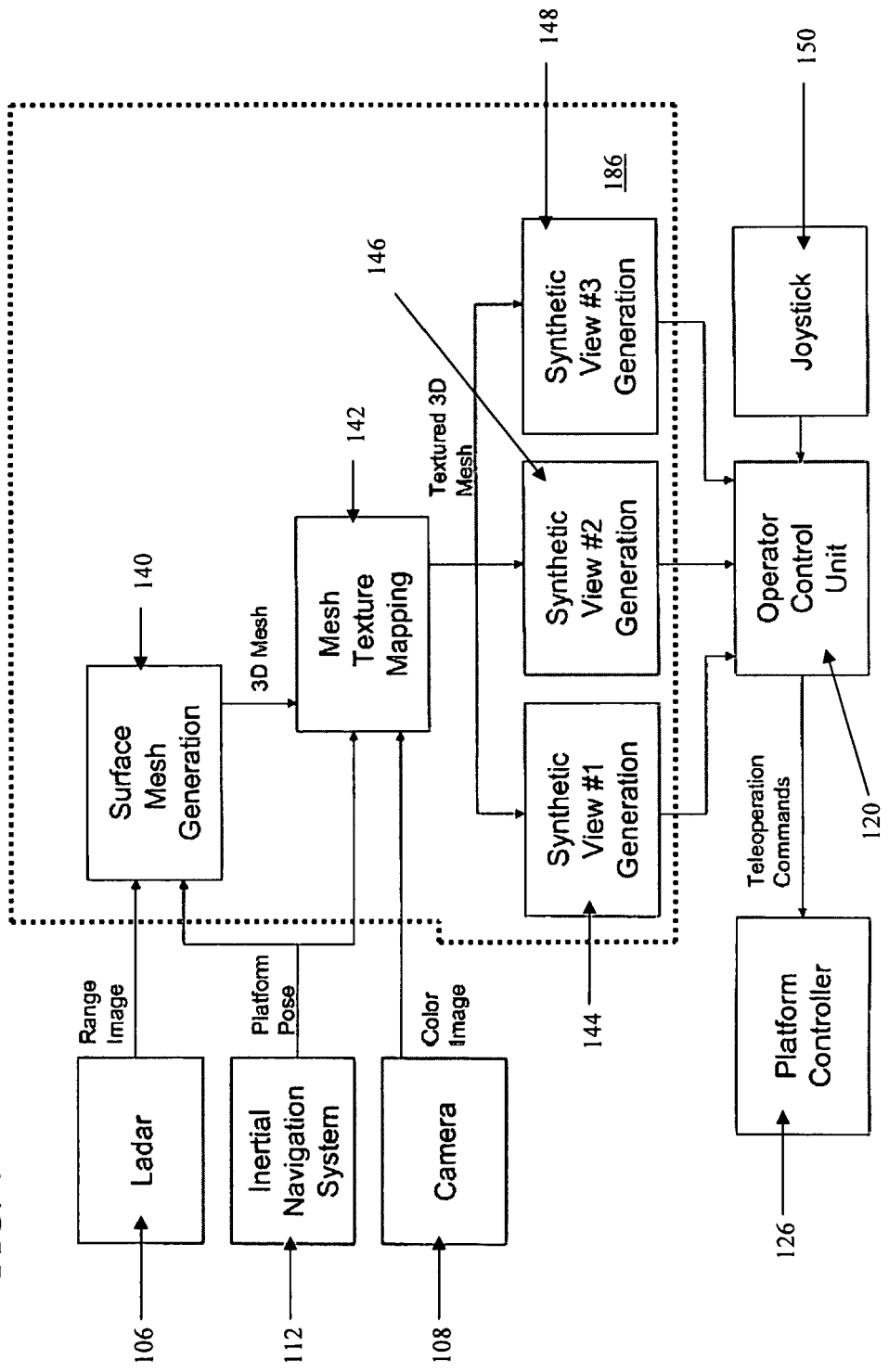
FIG. 4 illustrates a block diagram of a synthetic view generator module for generating synthetic views for remotely operating a robotic vehicle according to a preferred embodiment of the invention.

FIG. 4 illustrates a block diagram of a synthetic view generator module 186 for generating synthetic views for remotely operating a robotic vehicle according to a preferred embodiment of the invention. The inputs from sensors 106, 112 and 108 are fed into a surface mesh generation module 140 and mesh texture mapping module 142 respectively as shown. Together, surface mesh generation module 140 and mesh texture mapping module 142 generate synthetic views 144, 146 and 148 that are provided to operator control unit 120, which may include a joystick 150.

Figure 5:
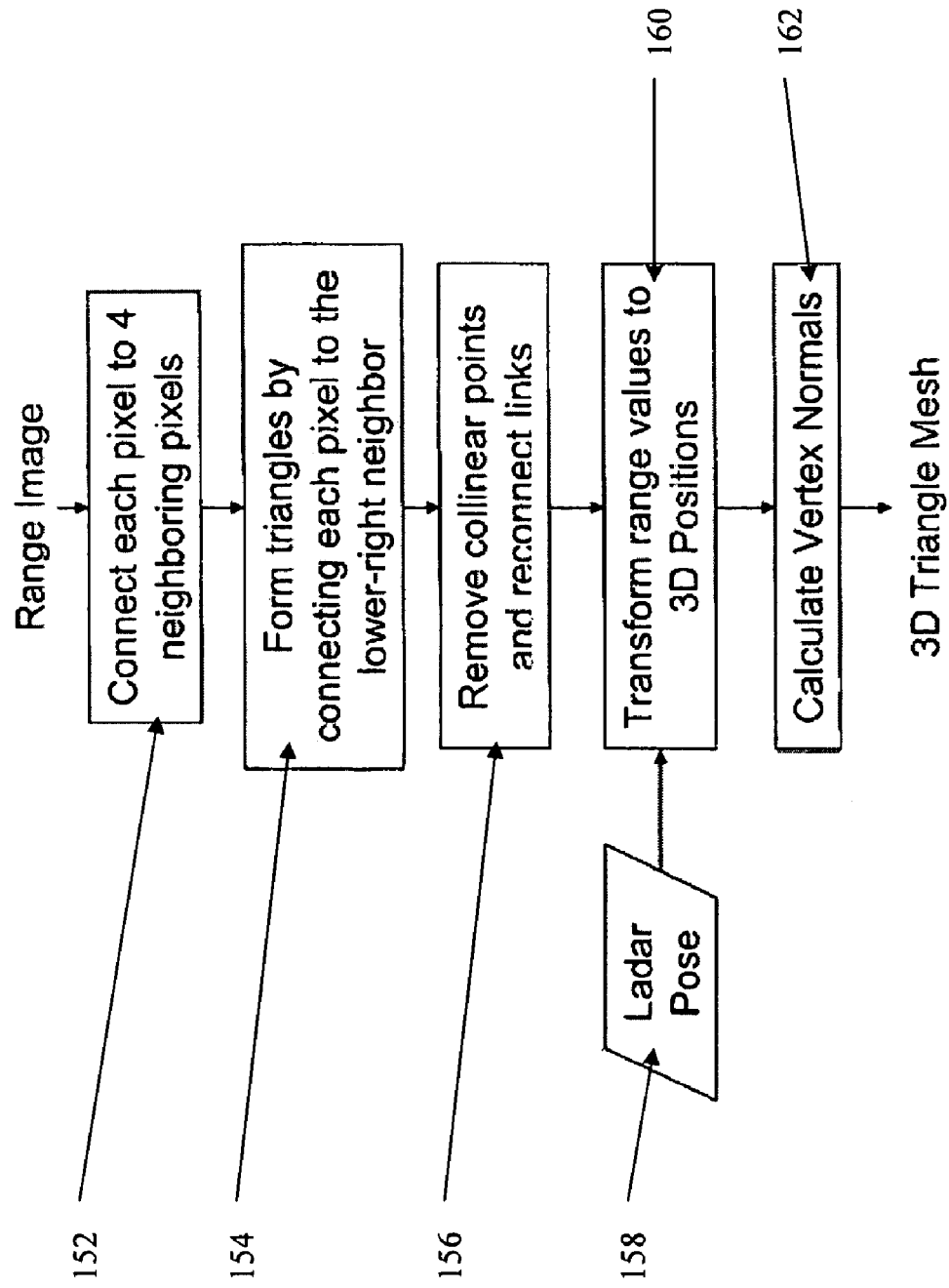
FIG. 5 illustrates a flow chart for generating a surface mesh from a range image according to a preferred embodiment of the invention.
Figure 6:
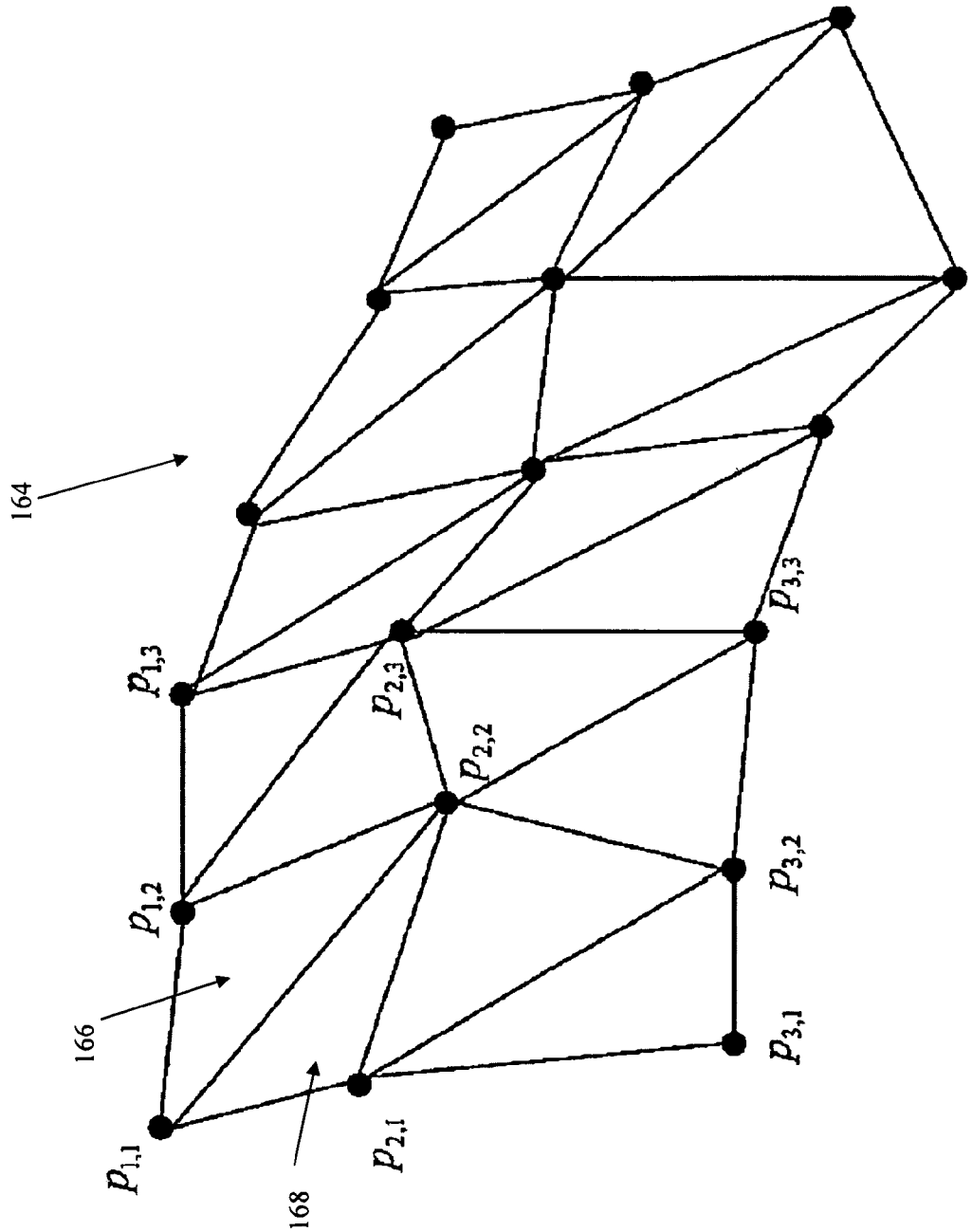
FIG. 6 illustrates an exemplary surface mesh generated by the process of FIG. 4 according to a preferred embodiment of the invention.

In order to create synthetic views of the robotic vehicle 104 and its operating environment, a representation of the world is created. This is achieved by first using LADAR 105 range measurements to determine a surface model for the environment with surface mesh generation module 140. FIG. 5 illustrates a flow chart for generating a surface mesh from a range image with surface mesh generation module 140 according to a preferred embodiment of the invention. In addition, FIG. 6 illustrates an exemplary surface mesh generated by surface mesh generation module 140 with the process of FIG. 4 according to a preferred embodiment of the invention.

The range measurements generated by LADAR 106 are in the form of a 2-Dimensional image. Each pixel value represents the range detected at that location. In order to form the range image into a 3-dimensional mesh, the individual points must be connected together to form a surface. This is achieved by connecting each image point to the four adjacent pixels in step 152 in FIG. 5, and as shown in FIG. 6. For example, $p_{i,k}$ is the pixel at row i and column k. To create the initial surface, $p_{i,k}$ is connected to $p_{i+1,k}$, $p_{i-1,k}$, $p_{i,k+1}$, and $p_{i,k-1}$. A mesh 164 of triangles 166 and 168 is created using this method in step 154. Since most graphics rendering programs use triangles 166 and 168 as 3-dimensional primitives, it is desired to have a mesh of triangles 166 and 168. A triangular mesh 164 is achieved by additionally connecting each pixel $p_{i,k}$ to a diagonal pixel $p_{i+1,k+1}$. In order to reduce the number of triangles 166 and 168 required to represent the surface, collinear points are removed from the surface mesh 164 in step 156.

The LADAR 106 range measurements 158 are transformed to 3-dimensional points using the extrinsic and intrinsic properties of the sensor in step 160. The extrinsic properties consist of the LADAR's 106 position and orientation in a global coordinate frame. The intrinsic parameters include the vertical and horizontal field of view of the sensor. Vertex normals of triangles 166 and 168 are then calculated in step 162, thereby resulting in a 3-Dimensional triangle mesh 164, as shown in FIG. 6.

Figure 7:
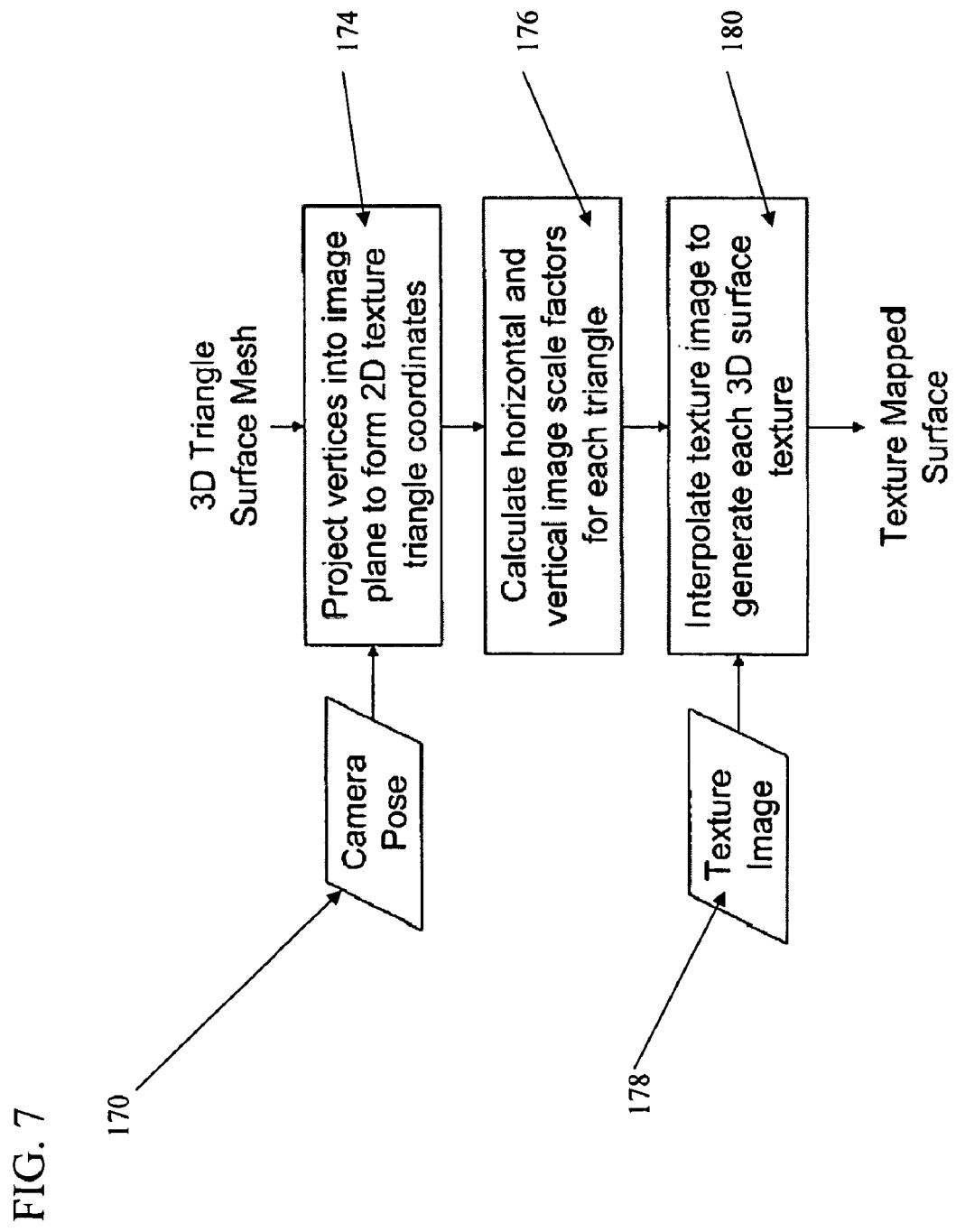
FIG. 7 illustrates a process for creating a texture mapped surface from a surface mesh according to a preferred embodiment of the invention.

FIG. 7 illustrates a process for creating a texture mapped surface 192, shown in FIGS. 8, 9, 12 and 13 from a surface mesh 164 according to a preferred embodiment of the invention. In addition to the 3-Dimensional spatial information provided by LADAR 106, camera 108 is used to collect the texture information from the environment, such as color. The texture information is then projected onto the surface model 164 to create a world representation that is easier to comprehend by the operator.

To texture map each face of the 3D surface, each vertex of the surface is projected into the camera's focal plane using the camera's position, orientation, and field-of-view in step 174 using camera pose 170. This computes the row and column of each vertex in the image domain. Each triangle in the 3D surface now has a corresponding 2D triangle in the image domain. By computing the ratio of the triangle side in the image domain to the 3D world in step 176, a horizontal and vertical conversion factor is found. The image domain triangle 178 can then be stretched and rotated in step 180 to fit the 3-Dimensional surface face. Repeating this process over all the face of the surface creates a 3-Dimensional textured representation of the robotic vehicle 104 and its environment. It is from this 3-Dimensional textured representation of the robotic vehicle 104 and its environment that synthetic views 144, 146 and 148 are generated by module 186 and presented to the operator on GUI 190.

Figure 8:
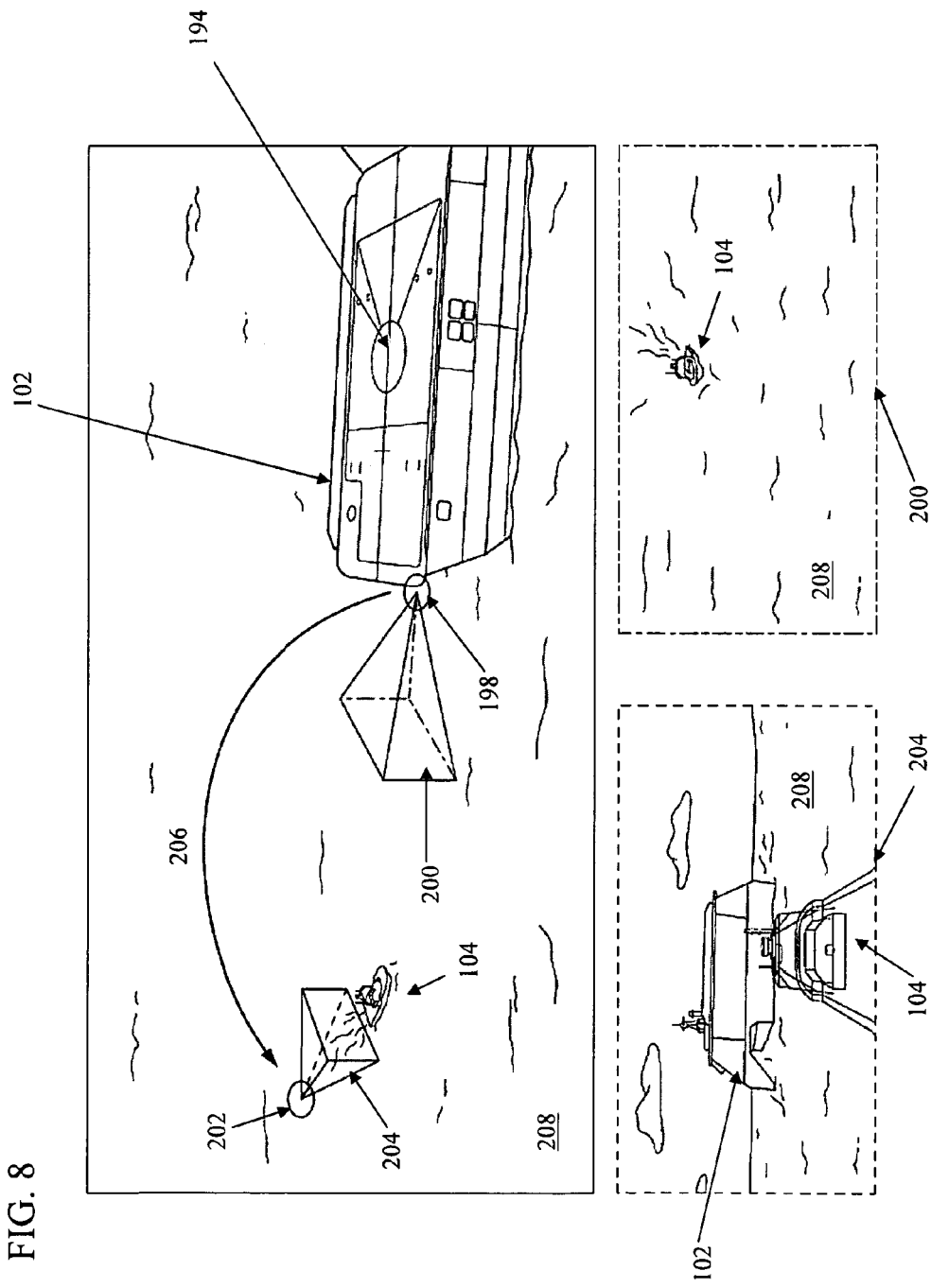
FIG. 8 illustrates an isometric view of a naval vessel and a remotely operated robotic vehicle along with a real camera view from the naval vessel and a virtual camera view from behind the robotic vehicle according to a preferred embodiment of the invention.

FIG. 8 illustrates an isometric view of a naval vessel 102 and a remotely operated robotic vehicle 104 along with a real camera view 200 from the naval vessel 102 and a virtual camera view 204 from behind the robotic vehicle 104 according to a preferred embodiment of the invention. In this example, naval vessel 102 is a Littoral Combat Ship (LCS), which is a key element of the U.S. Navy's plan to address asymmetric threats of the twenty-first century. Intended to operate in coastal areas of the globe, the LCS 102 is fast, highly maneuverable, and geared to supporting mine detection/elimination, anti-submarine warfare, and anti-surface warfare. The LCS 102 will utilize modular mission packages to provide focused mission capability and facilitate technology refresh. These modular mission packages will make heavy use of unmanned and manned Organic Offboard Vehicles (OOVs) 104 to provide persistent littoral surveillance for a broad range of missions, including reconnaissance, force protection, mine detection, special operations, anti-submarine warfare (ASW), and intelligence collection.

In many instances, rapid launch and recovery of OOVs 104 will be critical to mission success. Currently, a number of mechanical recovery techniques are used that are highly dependent upon the unique operator controls resident on each watercraft to guide the vehicle into a final recovery position. Operators controlling the incoming OOV 104 must make decisions while hampered by rough seas, limited sight lines, and a challenging "reverse-perspective" for controlling the incoming vehicle 104. The use of conventional teleoperation techniques result in operational limitations, increased recovery timelines, and increased risk of damage to the deployed vehicle and the ship. Control system 100, which provides a multi-view operator interface, can eliminate these limitations.

Due to limitations of camera mounts, bandwidth constraints, platform vibrations, environmental conditions, and other constraints, it is not always possible to provide the operator with the ideal video feed. The synthesis of virtual video feeds 144, 146 and 148 using real sensor data from sensors 106, 108, 110 and 112 allows the transformation of high-bandwidth LCS 102-based sensor data into synthetic feeds 144, 146 and 148 of the desired viewpoint to the operator.

In FIG. 8, LCS 102, which in this example is LCS-2, christened the USS Independence, has an aft flight deck 194. At the stern 196 of LCS 102, a camera 198 is mounted that views OOV 104 and its surrounding environment. Camera 198 possesses field of view 200, represented by the cone emanating from camera 198. Utilizing the information from sensors 106, 108, 110 and 112, system 100 is able to generate 206 a virtual camera 202 having a field of view 204. In FIG. 8, LCS 102 is shown resting in ocean 208. The location and angle of virtual camera 202 is configured by the operator and may be positioned at any location and angle desired by the operator.

In addition to transformed sensor data from sensors 106, 108, 110 and 112, other information is included in the synthetic videos 144, 146 and 148. Since the relative pose of the OOV 104 is estimated by system 100, CAD models of both the LCS 102 and OOV 104 are rendered directly into the synthetic view 204. Other information, such as the recovery capture mechanism or recommended paths, can be highlighted or directly drawn in the synthetic view, as shown in FIG. 9.

Figure 9:
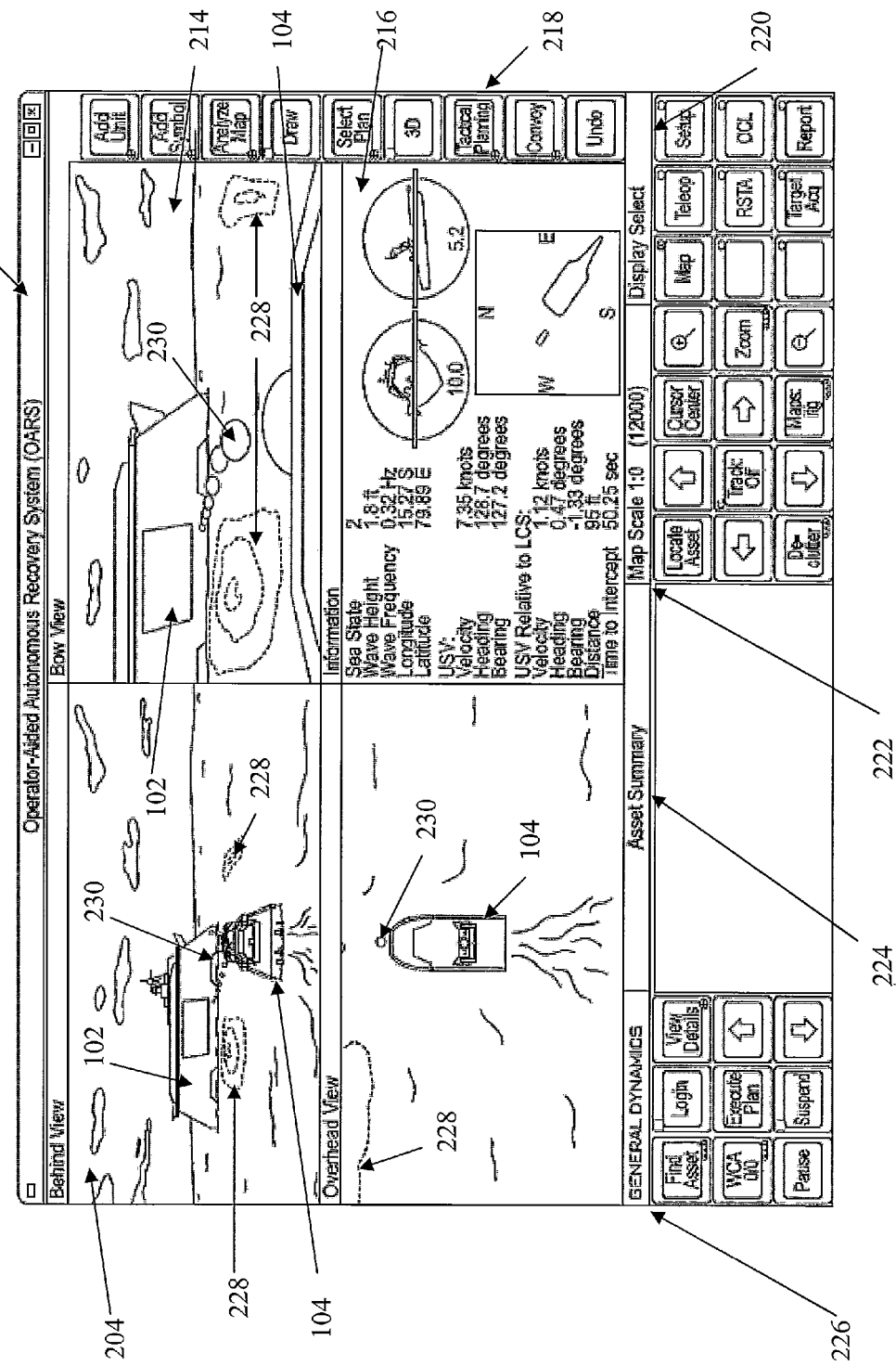
FIG. 9 illustrates a screen shot of a graphical user interface, which is used for controlling a remotely operated robotic vehicle, that is a part of an operator control unit according to a preferred embodiment of the invention.

FIG. 9 illustrates a screen shot 210 of GUI 190, which is used for controlling a remotely operated robotic vehicle 104, that is a part of an operator control unit 120 according to a preferred embodiment of the invention. System 100 is conventionally known as an Operator-Aided Autonomous Recovery System (OARS). Screen shot 210 includes synthetically generated views 204, 212 and 214. Synthetic view 204 is a view from a virtual camera positioned behind robotic vehicle 104. Synthetic view 212 is a view from a virtual camera positioned above robotic vehicle 104. Synthetic view 204 is a view from a virtual camera positioned on the bow of robotic vehicle 104. An information panel 216 is provided that describes the operational state of robotic vehicle 104.

Virtual panel 218 provides a variety of function keys that the operator may use to manipulate GUI 190. These keys include the ability to add additional robotic vehicle units to the views 204, 212 and 214. The operator may add symbols to the views 204, 212 and 214 as desired. The operator may select to analyze the map generated by system 100. The operator may draw on the synthetic views as desired. The operator may select a plan of operation recommended by module 114 and 118. The operator may select a 2-Dimensional or 3-Dimensional view. The operator may select for system 118 to provide tactical planning for the operation of robotic vehicle 104. The operator may chose to convoy robotic vehicle 104 with mother ship 102. The operator may also chose to undo any of the above selections.

In virtual panel 220, the operator may control the display by selecting a map, teleoperation of robotic vehicle 104, display setup. Additionally, the operator may select a Reconnaissance, Surveillance and Target Acquisition (RSTA) view. The operator can also select an Operational Control Level (OCL) of robotic vehicle 104. The operator can further select Target Acquisition as well as a report feature.

In virtual panel 222, the operator can manipulate the map selected from panel 220 with various arrow keys, locate asset key, cursor center key, a track off feature, a declutter feature, and a map integration feature. In virtual panel 224, an asset summary may be provided describing the capabilities of robotic vehicle 104. In virtual panel 226, general dynamic features are provided. These features include finding the asset, i.e. the robotic vehicle 104. These features also include logging into to system 100, viewing details of the mission, executing a plan proposed by system 100, pausing a plan proposed by system 100, suspending a plan proposed by system 100, receiving a Worst Case Analysis (WCA) from system 100, and arrow keys to scroll through the various screens.

In views 204, 212 and 214, modules 184 and 188 may generate and display warning areas 228 alerting the operator of areas to avoid, such as in these views areas of high water turbulence from the wake and propeller wash of LCS 102. These areas may be shown in various shades of red signifying low to high danger areas. In addition, modules 184 and 188 may identify a recommended course 230 for the operator, symbolized by floating spheres.

Recovery of OOVs 104 requires precision control in dynamic environments. In addition to enhanced raw and synthetic views, system 100 provides easy to understand measurement indicators such as relative position, speed, and orientation to the LCS 102. These allow the operator to better understand the dynamic environment so that the correct control inputs can be applied. System 100 utilizes the current system state of LCS 102 and OOV 104 to recommend safe control sequences and warn against potentially dangerous control inputs.

The following scenarios present some of the currently envisioned uses and benefits of system 100. The first stage in recovering an OOV 104 is the approach to the LCS 102 and maintenance of a course safely astern of the LCS 102. The initial approach will most likely be done by the autonomous navigation system onboard the OOV 104 or through conventional teleoperation techniques. As the vehicle 104 enters within 100-200 m of the LCS 102, system 100 will begin to aid the operator. In addition to any teleoperation sensors 106, 108, 110 and 112 used by the operator, system 100 will provide a bird's eye view 212 synthetic image feed to help align the incoming vehicle 104 with the LCS 102. In addition to synthetic and raw image feeds, the relative distance, speed, and heading will be displayed to allow the operator to safely put the OOV 104 in a position ready for mating with the catch mechanism.

At 10-40 meters of the ship 102, the incoming OOV 104 will typically attach itself to a towed sled, cradle, steel cable, or other catch mechanism. During this operation, timing ensures successful mating with the catch mechanism. An improper trajectory can result in unsuccessful and potentially dangerous situations. In addition, it is desirable for the operator to time the final maneuver precisely in order to prevent failures due to excessive heave, pitch, or roll at critical times. In order to mitigate these risks, system 100 provides the operator with enhanced views and simplified graphical representations of key information. At the various stages of recovery, the information will be displayed similar to head-up displays in aircraft systems. The combination of raw sensor feeds and synthetic viewpoints will provide the operator to situational awareness of the incoming OOV 104. If needed, system 100 will highlight views of recovery components (such as a cable towed by the LCS 102) to increase the operator's overall situational awareness. System 100 will be monitoring the overall state and will provide warnings to the operator when potentially dangerous conditions are imminent and the operator should abort the connection attempt temporarily.

The final step for many recovery solutions is to tow the OOV 104 towards the LCS 102 and onto the stern ramp. This final step is governed by the complex dynamics of the OOV 104 being under tow in the most turbulent area of the wake zone. Some major risk factors include large waves approaching astern the OOV 104 or suction forces caused by the LCS 102 wake. These can cause the tow line to no longer be taut resulting in loss of connection or collision with the LCS 102. System 100 wave measurement capabilities will warn the operator of potentially dangerous waves. Graphical overlays help convey the optimal OOV 104 location and the forces present on the OOV 104 in order to help the operator make control decisions until the OOV 104 is safely recovered.

Figure 10:
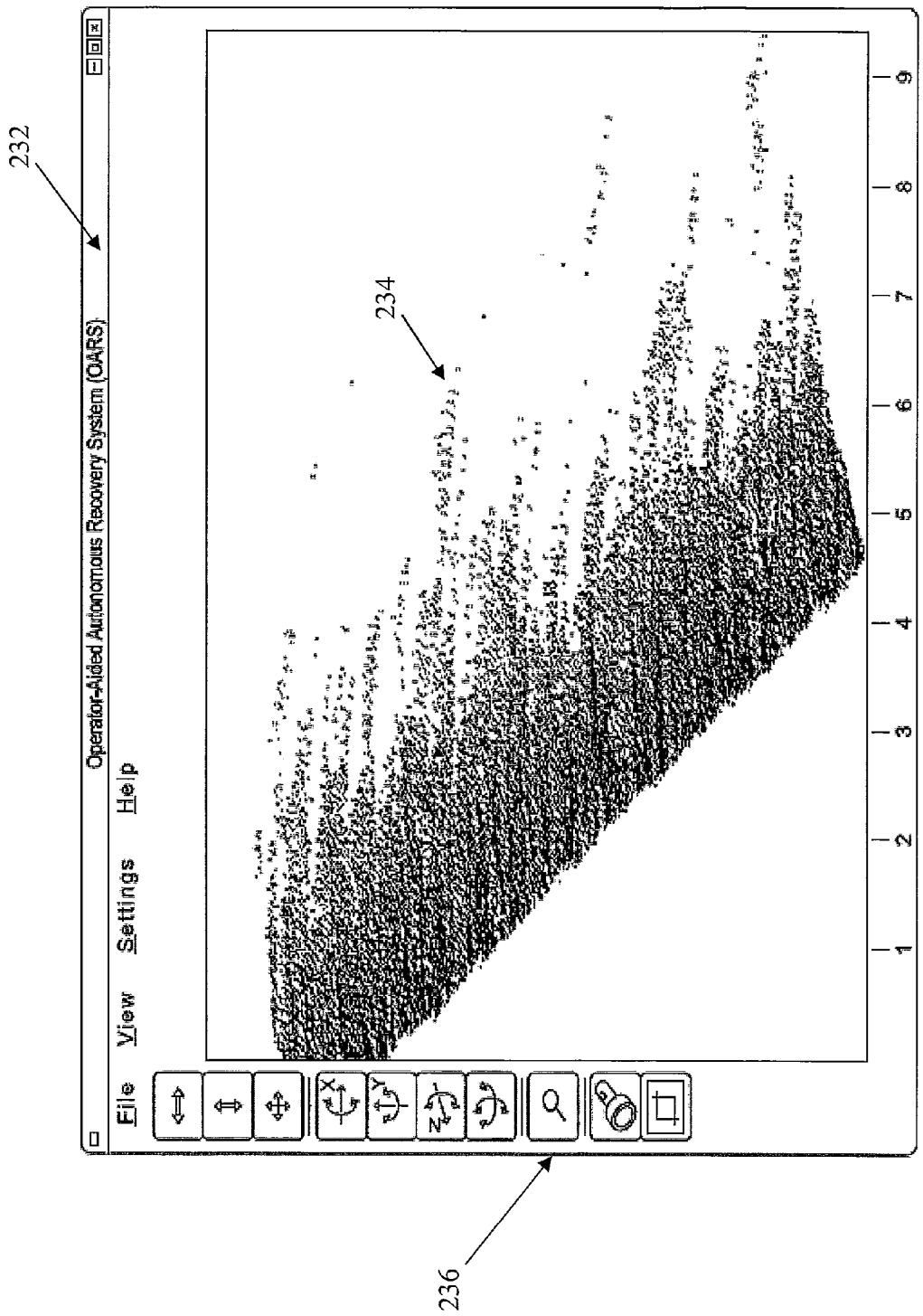
FIG. 10 illustrates a screen shot of a graphical user interface, which is displaying an exemplary LADAR scan used to create a surface mesh, according to a preferred embodiment of the invention.

FIG. 10 illustrates a screen shot 232 of a GUI 190, which is displaying an exemplary LADAR 106 scan 234 used to create a surface mesh, according to a preferred embodiment of the invention. LADAR scan 234 consists of point clouds representing the surface of ocean 208. The operator may use tool buttons on virtual panel 236 to refine the LADAR scan information 234, which is then used to generate the surface mesh.

Figure 11:
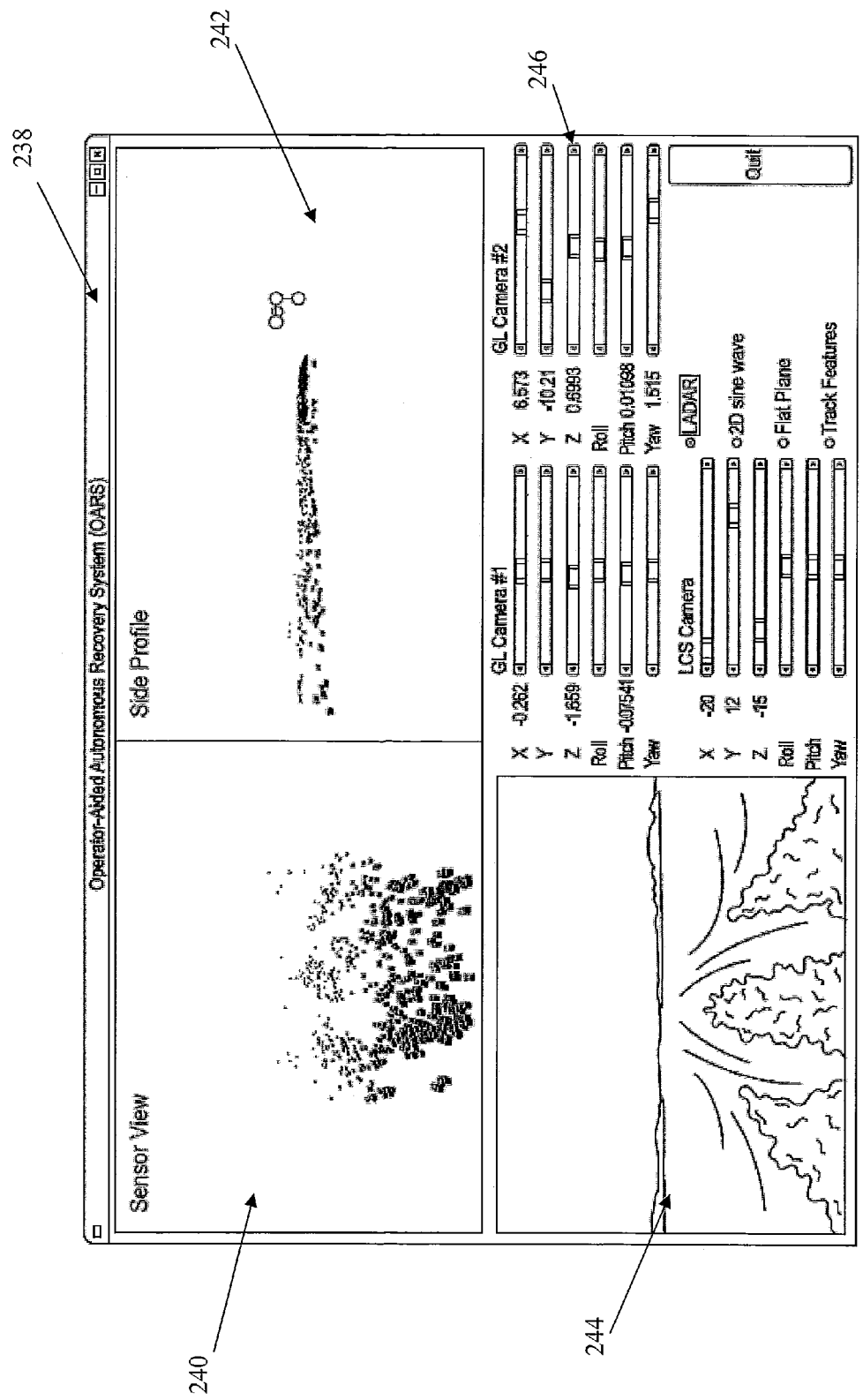
FIG. 11 illustrates a screen shot of a graphical user interface, which is displaying an exemplary camera view used to create a surface mesh, according to a preferred embodiment of the invention.

It is highly desirable to have an accurate representation of the water surface for system 100. An accurate representation of the water surface allows for more realistic synthetic views to be created and viewed by the operator. By measuring the water's surface over time, more advanced wave and wake models can be estimated in order to accurately predict the path of the OOV 104. In addition to LADAR 106, stereo cameras may be used to collect water surface data, as shown in FIG. 11. FIG. 11 illustrates a screen shot 238 of a GUI 190, which is displaying an exemplary camera view used to create a surface mesh with a stereo camera system, according to a preferred embodiment of the invention. The stereo camera system captures and matches points on the water surface and displays it on the sensor views 204 and 242 as small squares. Together these small squares form a cloud that is used to generate a surface mesh. A live feed of the water surface from camera 198 is shown in view 244. A series of controls over the LCS camera 198 are provided in virtual panel 246. In addition, controls for two virtual cameras 202, shown as GL Camera #1 and GL Camera #2, are also provided. The user may also select the use of LADAR from panel 246 as well as other features, including quitting this screen shot 238.

Figure 12:
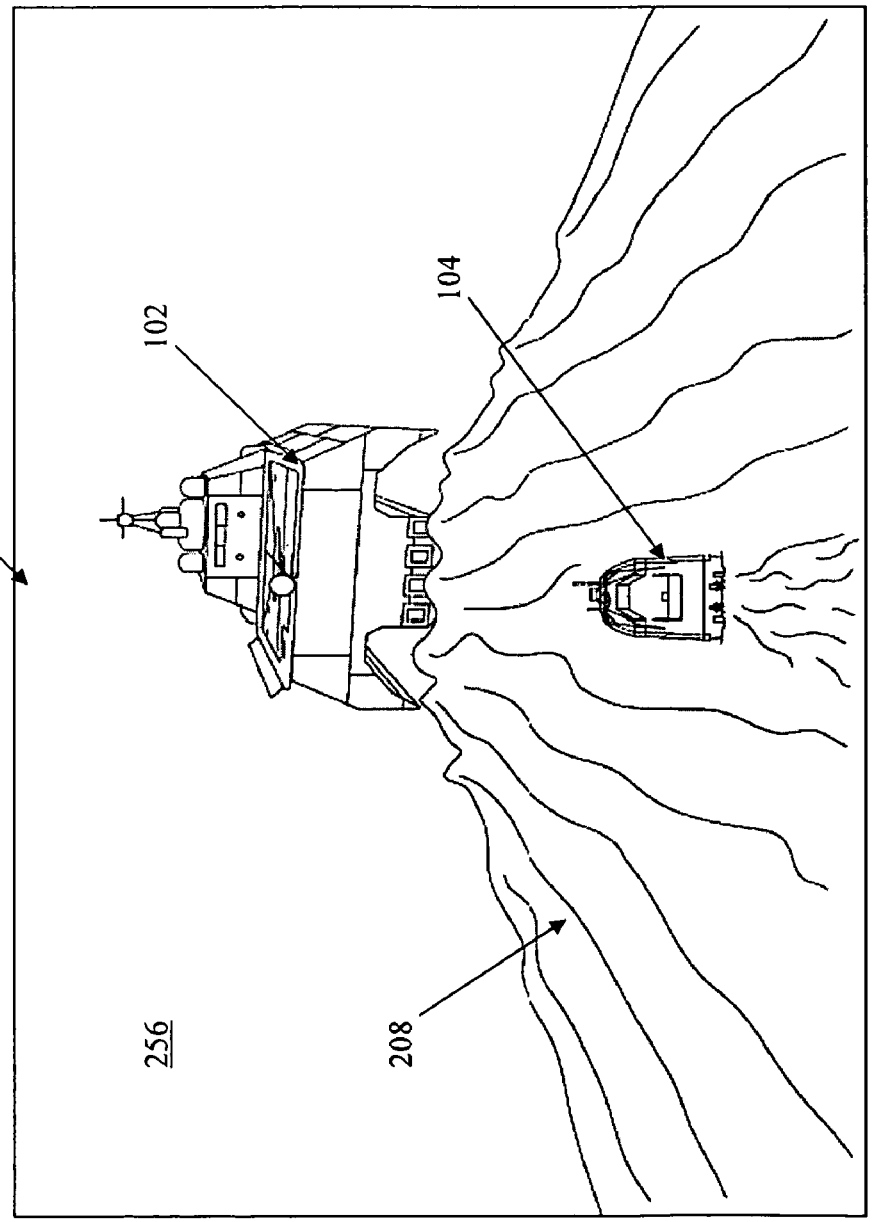
FIG. 12 illustrates a 3-Dimensional model generated by a environment predictor module according to a preferred embodiment of the invention.

FIG. 12 illustrates a 3-Dimensional model 248 generated by environment predictor module 114 according to a preferred embodiment of the invention. Using CAD information, module 114 generates a view of ship 102. Using LADAR 106 and camera 108 information, module 114 generates ocean surface 208. Also using CAD information, module 114 generates a view of robotic vehicle 104. Then, using LADAR 106, camera 108, and positional information from navigational system 116, module 114 is able to orient ship 102 and robotic vehicle 104 relative to each other.

FIG. 13 illustrates a screen shot 250 of a GUI 190, which is displaying two synthetically generated views 204 and 212 and a real camera view 244, that includes controls 246 for positioning the virtual cameras 202 and real camera 198 according to a preferred embodiment of the invention. The sensors 106, 108, 110, and 112 do not provide a global perspective of the entire environment surrounding ship 102 and robotic vehicle 104. Areas for where no such information is available are shown as blank regions 256. System 100 may be configured to show only the sensed environment, as depicted in views 212 and 204 in FIG. 13, or it may alternatively simulate the remaining environment based upon sensed data as shown in views 204 and 214 in FIG. 9.

Figure 14:
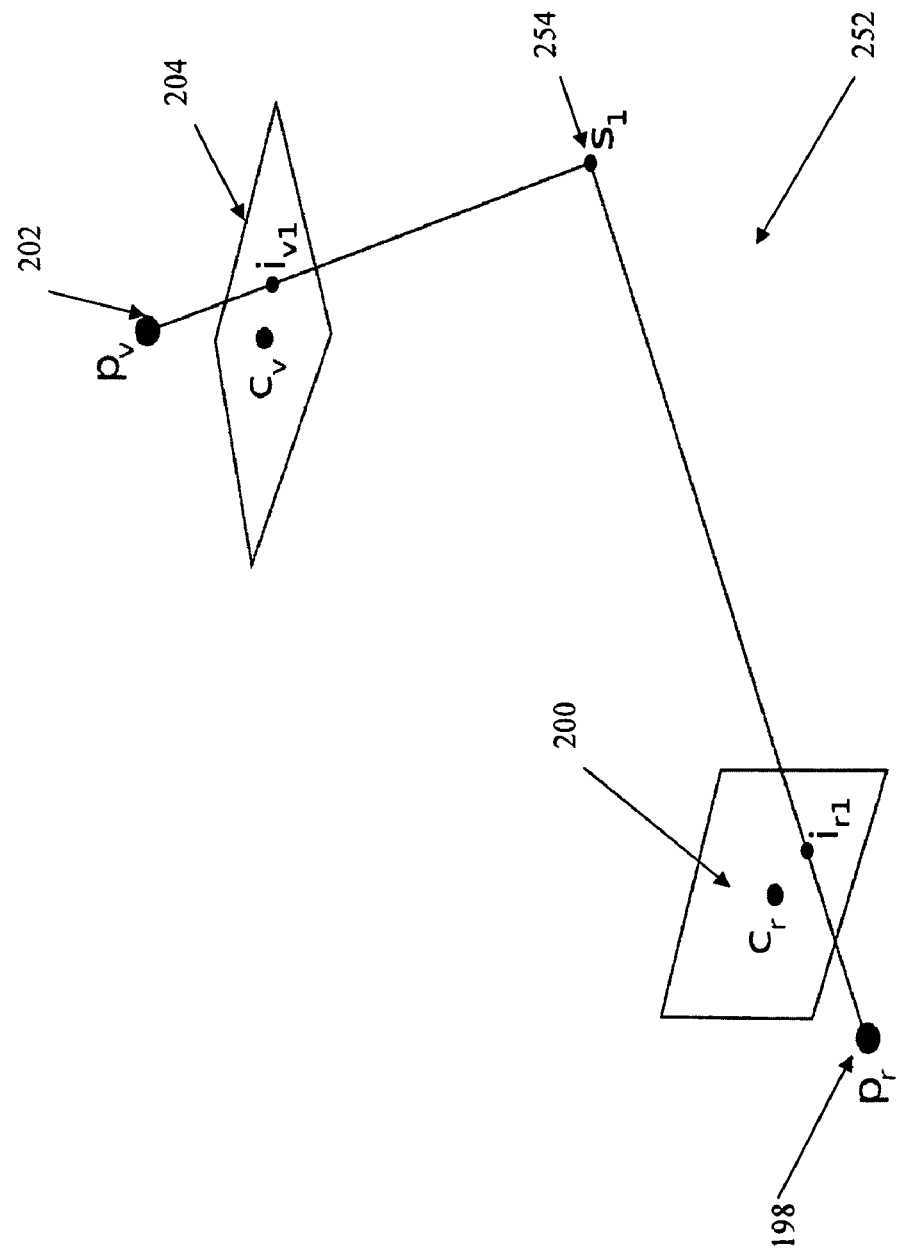
FIG. 14 illustrates a graphical description of a real camera view of a spatial location and a synthetically generated camera view of the same spatial location according to a preferred embodiment of the invention.

FIG. 14 illustrates a graphical description 252 of a real camera 198 view 200 of a spatial location 254 and a synthetically generated camera 202 view 204 of the same spatial location 254 according to a preferred embodiment of the invention. Synthetic camera views 204 are formed by utilizing simple perspective projection model. This process is repeated for every pixel to form the synthetic image 204. The synthetic camera view 204 is achieved by solving a set of line-plane intersection equations for a pinhole camera model. Each point in the scene, s, corresponds to a pixel location on the focal plane of the real camera. A point 252, $s_l$ is projected onto the focal plane of the real camera at the location $i_{rl}$ while passing through the camera's 202 pinhole at location $p_r$. The virtual camera 202 pose is defined by the pinhole location $p_v$ and focal plane center point $c_v$. The pixel location of the point $s_l$ is determined by solving for the intersection of the virtual camera's 202 focal plane and the line formed by the points $p_v$ and $s_l$. Once the pixel location $i_{vl}$ is known then the virtual image is formed by interpolating the real image value at point $i_{rl}$ and inserting into the virtual image at $i_{vl}$. By performing this warp calculation at every pixel location in the virtual camera, a synthetic camera view is formed.

While the invention has been shown and described with reference to a particular embodiment thereof, it will be understood to those skilled in the art, that various changes in form and details may be made therein without departing from the spirit and scope of the invention.

The invention claimed is:

1. A system for controlling a remotely operated vehicle, comprising:
    a sensor tracking system configured to sense a remotely operated vehicle, the sensor tracking system being located at a first location and the remotely operated vehicle being located at a second location remote from the first location;
    a control system at the first location coupled to the sensor tracking system, the control system configured to remotely control the remotely operated vehicle; the control system comprising:
        a synthetic view generator configured to construct a virtual model of the remotely operated vehicle and its surrounding environment based upon an input from the sensor tracking system;
        a graphical user interface configured to display a synthetic view of the virtual model;
        a synthetic viewer control configured to manipulate an orientation of the synthetic view; and
        an operator control unit configured to control the remotely operated vehicle.

2. The system of claim 1, further comprising a prediction module configured to predict a future state of the remotely operated vehicle based upon information from the sensor tracking system.

3. The system of claim 1, wherein the synthetic view is generated using a stored CAD drawing of the remotely operated vehicle.

4. The system of claim 1, further comprising an operator aid module configured to generate a recommended course of action based upon information from the sensor tracking system.

5. The system of claim 1, further comprising an operator aid module configured to generate warnings regarding a potential course of action based upon information from the sensor tracking system.

6. The system of claim 1, wherein the sensor tracking system includes one or more of the following sensor systems: a LADAR, a camera, a GPS device, and an inertial guidance system.

7. The system of claim 1, wherein the remotely operated vehicle is unmanned.

8. The system of claim 1, wherein the remotely operated vehicle is manned.

9. The system of claim 8, wherein an operator on the remotely operated vehicle has an option of exercising at least partial control over an operation of the remotely operated vehicle.

10. The system of claim 1, wherein the virtual model is constructed from a surface mesh generated from information provided by the sensor tracking system.

11. A virtual control environment for remotely operating a robotic vehicle, comprising:
    a sensor array that detects the robotic vehicle and its surrounding environment, the sensor array being located at a first location and the robotic vehicle being located at a second location remote from the first location;
    a module configured to generate a computer model of the robotic vehicle and its surrounding environment based upon information collected by the sensor array;
    a synthetic view generator module configured to create virtual views of the robotic vehicle and its surrounding environment based upon the computer model;
    a graphical user interface configured to display a virtual view created by the synthetic view generator module; and
    an operator control unit located at the first location and configured to control the robotic vehicle based upon the virtual view.

12. The virtual control environment of claim 11, further comprising a prediction module configured to predict a future state of the remotely operated vehicle based upon information from the sensor array.

13. The virtual control environment of claim 11, wherein the virtual view is generated using a stored CAD drawing of the remotely operated vehicle.

14. The virtual control environment of claim 11, further comprising an operator aid module configured to generate a recommended course of action based upon information from the sensor array.

15. The virtual control environment of claim 11, further comprising an operator aid module configured to generate warnings regarding a potential course of action based upon information from the sensor array.

16. The virtual control environment of claim 11, wherein the sensor array includes one or more of the following sensor systems: a LADAR, a camera, a GPS device, and an inertial guidance system.

17. The virtual control environment of claim 11, wherein the robotic vehicle is unmanned.

18. The virtual control environment of claim 11, wherein the robotic vehicle is manned.

19. The virtual control environment of claim 18, wherein an operator on the robotic vehicle has an option of exercising at least partial control over an operation of the robotic vehicle.

20. The virtual control environment of claim 11, wherein the computer model is constructed from a surface mesh generated from information provided by the sensor array.

21. A method of controlling a remotely operated vehicle with a virtual images of the remotely operated vehicle, comprising:
    remotely sensing the remotely operated vehicle and its surrounding environment with a sensor array, the sensor array being located at a first location and the remotely operated vehicle being located at a second location remote from the first location;
    generating a virtual model of the remotely operated vehicle and its surrounding environment based upon information gathered by the sensor array;
    generating a virtual view of the remotely operated vehicle and its surrounding environment;
    displaying the virtual view on a graphical user interface; and
    controlling, using a controller, the operation of the remotely operated vehicle based upon viewing the virtual view, the controller being located at the first location.

22. The method of claim 21, further comprising predicting a future state of the remotely operated vehicle based upon information from the sensor array.

23. The method of claim 21, further comprising displaying a live image of the remotely operated vehicle on the graphical user interface.

24. The method of claim 21, further comprising generating a recommended course of action based upon information from the sensor array.

25. The method of claim 21, further comprising generating warnings regarding a potential course of action based upon information from the sensor array.

* * * * *